US012237879B2

United States Patent
Yuan et al.

(10) Patent No.: US 12,237,879 B2
(45) Date of Patent: Feb. 25, 2025

(54) MULTI-USER DETECTION METHOD AND APPARATUS FOR CELL-FREE MIMO

(71) Applicant: ZTE Corporation, Shenzhen (CN)

(72) Inventors: Zhifeng Yuan, Shenzhen (CN); Yihua Ma, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/269,020

(22) PCT Filed: Oct. 20, 2021

(86) PCT No.: PCT/CN2021/125000
§ 371 (c)(1),
(2) Date: Jun. 22, 2023

(87) PCT Pub. No.: WO2022/134800
PCT Pub. Date: Jun. 30, 2022

(65) Prior Publication Data
US 2024/0048186 A1    Feb. 8, 2024

(30) Foreign Application Priority Data

Dec. 25, 2020   (CN) .......................... 202011568999.1

(51) Int. Cl.
*H04B 7/024*   (2017.01)
*H04B 7/08*    (2006.01)

(52) U.S. Cl.
CPC ........... *H04B 7/024* (2013.01); *H04B 7/0854* (2013.01); *H04B 7/0857* (2013.01)

(58) Field of Classification Search
CPC .... H04B 7/024; H04B 7/0854; H04B 7/0857; H04B 7/0456; H04B 7/0452; H04B 17/00;
(Continued)

(56) References Cited

U.S. PATENT DOCUMENTS

| 11,606,129 B1* | 3/2023 | Kanno ................. H04B 7/0632 |
| 2014/0185700 A1* | 7/2014 | Dong .................... H04W 52/42 375/267 |
| 2015/0229374 A1 | 8/2015 | Kuroda |
| 2017/0093465 A1 | 3/2017 | Molev Shteiman et al. |

FOREIGN PATENT DOCUMENTS

| CN | 103703735 A | 4/2014 |
| CN | 106160808 A | 11/2016 |

(Continued)

OTHER PUBLICATIONS

Intel Corporation, "On CSI enhancements for MTRP and FDD reciprocity" 3GPP TSG RAN WG1 103-e R1-2009452 e-Meeting, Oct. 26-Nov. 13, 2020.

(Continued)

*Primary Examiner* — Vineeta S Panwalkar
(74) *Attorney, Agent, or Firm* — CANTOR COLBURN LLP

(57) ABSTRACT

Embodiments of the present disclosure provide a multi-user detection method and apparatus for cell-free Multiple-Input Multiple-Output (MIMO). The method includes: receiving, by a Central Processing Unit (CPU) of a cell-free MIMO system, an MRC merged data symbol stream $S_{MRC}=H^H Y$ of K users transmitted by an Access Point (AP), and multiplying $S_{MRC}$ by a conjugate transpose matrix $S_{MRC}^H$ of $S_{MRC}$ to obtain a K*K matrix $S_{MRC} S_{MRC}^H$; and performing singular value decomposition on the matrix $S_{MRC} S_{MRC}^H$ to obtain a unitary matrix V and a diagonal matrix A, obtaining a diagonal matrix $\Lambda$ according to the diagonal matrix A, and estimating sending-end data symbols of the K users by a formula $\hat{S}=V\Lambda V^H S_{MRC}$.

20 Claims, 6 Drawing Sheets

(58) Field of Classification Search
CPC ............. H04L 25/0204; H04L 25/0224; H04L 25/03891; H04W 24/00
See application file for complete search history.

(56) References Cited

FOREIGN PATENT DOCUMENTS

| CN | 112822697 A | 5/2021 |
|---|---|---|
| EP | 3186936 B1 | 7/2019 |

OTHER PUBLICATIONS

International Search Report for corresponding application PCT/CN2021/125000 filed Oct. 20, 2021; Mail date Dec. 28, 2021.
NTT DOCOMO, " Capacity enhancement of DL MU-MIMO with increased PMI feedback bits for small-cells scenario", 3GPP TSG RAN WG1 Meeting #66 R1-112434 Athens, Greece, Aug. 22-26, 2011.
European Search Report for corresponding application EP21908801; Mail date May 24, 2024.
Nguyen The Khai, Max Min QoS Power Control in Generalized Cell Free Massive MIMO-NOMA with Optimal Backhaul Combining, IEEE Transactions on Vehicular Technology, IEEE vol. 69, No. 10, Jun. 30, 2020, XP011816484.
Zbairi Mohamed, "Towards Optimal Spectral Efficiency of Cell Free Massive MIMO Based Linear Detector's in 5G", 2020 International Symposium on Advanced Eletrical Communication Technologies, IEEE, Nov. 25, 2020, pp. 1-6, XP033967695.

\* cited by examiner

MULTI-USER DETECTION METHOD AND APPARATUS FOR CELL-FREE MIMO

CROSS REFERENCE

This application is a National Stage Filing of the PCT International Application No. PCT/CN2021/125000 filed on Oct. 20, 2021, which claims priority to Chinese Application No. 202011568999.1 filed on Dec. 25, 2020 with China National Intellectual Property Administration, the entirety of which is herein incorporated by reference.

TECHNICAL FIELD

Embodiments of the present disclosure relate to the field of communication, and more particularly relate to a multi-user detection method and apparatus for cell-free Multiple-Input Multiple-Output (MIMO).

BACKGROUND

When a plurality of pieces of User Equipment (UE) simultaneously transmit data to a cell-free MIMO network, a Central Processing Unit (CPU) in a cell-free MIMO system is required to perform a multi-user detection. The CPU of the cell-free MIMO system was initially designed to perform the multi-user detection based on Maximal Ratio Combining (MRC), because the MRC is the simplest and does not require increasing a fronthaul bandwidth from an Access Point (AP) in the cell-free MIMO system to the CPU. However, the MRC-based multi-user detection usually does not have optimal performance due to neglect of interference between users. Particularly, as the number of simultaneously accessing users is increased, the performance of the MRC-based multi-user detection degrades. Thus, a multi-user detection method having better performance is required to be designed for the cell-free MIMO system. However, in order to obtain a multi-user detection better than the MRC-based multi-user detection for the current cell-free MIMO system, APs are required to transmit to the CPU the channel information of users having access to the APs, so that the CPU can consider, based on the received channel information, relevance of spatial domain channels of the users, thereby performing multi-user detection that can better restrain multi-user mutual interference. Some examples of such multi-user detection with performance better than the MRC-based multi-user detection include a Zero Forcing (ZF)-based multi-user detection or a Minimum Mean Square Error (MMSE)-based multi-user detection.

Compared with the MRC-based multi-user detection, the ZF-based multi-user detection or the MMSE-based multi-user detection in the current industry has one defect: the ZF-based multi-user detection or the MMSE-based multi-user detection requires the APs to transmit to the CPU the channel information of the users having access to the APs, while the original MRC-based multi-user detection does not. The AP is required to transmit the channel information to the CPU, which undoubtedly increases the fronthaul bandwidth from the AP to the CPU, resulting in an increase in cost of the cell-free MIMO system.

SUMMARY

Embodiments of the present disclosure provide a multi-user detection method and apparatus for cell-free MIMO, which may at least solve the problems that in related technologies, during a multi-user detection, an AP is required to transmit channel information to a CPU, resulting in an increase in a fronthaul bandwidth from the AP to the CPU.

According to an embodiment of the present disclosure, a multi-user detection method for cell-free MIMO is provided and includes:

receiving, by a receiving end of a cell-free MIMO system, a data symbol stream $S_{MRC}=H^H Y$ of K users transmitted by an Access Point (AP), where $S_{MRC}=H^H Y$ denotes a K*L matrix, with each row representing L data symbols of one user, and both K and L are positive integers;

multiplying $S_{MRC}$ by a conjugate transpose matrix $S_{MRC}^H$ of $S_{MRC}$ to obtain a K*K matrix $S_{MRC}S_{MRC}^H$;

performing Singular Value Decomposition (SVD) on the matrix $S_{MRC}S_{MRC}^H$ to obtain a unitary matrix $V=[v_1, v_2, \ldots v_K]$ and K real numbers $a_1, a_2 \ldots a_K$, such that $$\frac{1}{L} S_{MRC} S_{MRC}^H = VAV^H,$$

where $V^H$ is a transpose matrix of the unitary matrix V, and $$A = \begin{bmatrix} a_1 & & & \\ & a_2 & & \\ & & \ddots & \\ & & & a_K \end{bmatrix};$$

or calculating K characteristic values $a_1, a_2 \ldots a_K$ and corresponding K characteristic vectors $v_1, v_2, \ldots v_K$ of the matrix $S_{MRC}S_{MRC}^H$ or $$\frac{1}{L} S_{MRC} S_{MRC}^H,$$

such that $$\left(\frac{1}{L} S_{MRC} S_{MRC}^H\right) v_k = v_k a_k;$$

obtaining a diagonal matrix where $$\Lambda = \begin{bmatrix} \lambda_1 & & & \\ & \lambda_2 & & \\ & & \ddots & \\ & & & \lambda_K \end{bmatrix},$$

where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma_2$ is a noise variance on received signals of the AP;

estimating, by a formula $\tilde{S}=V\Lambda V^H S_{MRC}$, sending-end data symbols of the K users corresponding to the data symbol stream $S_{MRC}$.

According to an exemplary embodiment, before obtaining the diagonal matrix Λ, the method further includes: receiving, by the receiving end, the noise variance $\sigma^2$ transmitted by the AP, or determining, by the receiving-end CPU, the noise variance $\sigma^2$ according to an attribute of the AP.

According to an embodiment of the present disclosure, a multi-user detection method for cell-free MIMO is further provided and includes:

receiving, by a receiving end of a cell-free MIMO system, a data symbol stream $S_{MRC}=H^HY$ of K users transmitted by an Access Point (AP), where $S_{MRC}=H^HY$ denotes a K*L matrix, with each row representing L data symbols of one user, and both K and L are positive integers;

performing singular value decomposition on the matrix $S_{MRC}$ to obtain a unitary matrix $V=[v_1, v_2, \ldots v_K]$ and K real numbers $\omega_1, \omega_2, \ldots \omega_K$, such that $S_{MRC}=V(\sqrt{L}\Omega)U^H$, where $U^H$ is a transpose matrix of a unitary matrix U, and $\Omega$ is a K*L matrix:

$$\Omega = \begin{bmatrix} \omega_1 & & & \\ & \omega_2 & & 0 \\ & & \ddots & \\ & & & \omega_K \end{bmatrix};$$

obtaining a diagonal matrix $$\Lambda = \begin{bmatrix} \lambda_1 & & & \\ & \lambda_2 & & \\ & & \ddots & \\ & & & \lambda_K \end{bmatrix},$$

where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP, $a_k=|\omega_k|^2$; and estimating, by a formula $\tilde{S}=V\Lambda V^H S_{MRC}$, sending-end data symbols of the K users corresponding to the data symbol stream $S_{MRC}$, where $V^H$ is a transpose matrix of the unitary matrix V.

According to an exemplary embodiment, before obtaining the diagonal matrix $\Lambda$, the method further includes: receiving, by the receiving end, the noise variance $\sigma^2$ transmitted by the AP, or determining, by the receiving-end CPU, the noise variance $\sigma^2$ according to an attribute of the AP.

According to an embodiment of the present disclosure, a multi-user detection apparatus for cell-free MIMO is provided, is located in a CPU of a cell-free MIMO system, and includes:

a receiving module, configured to receive a data symbol stream $S_{MRC}=H^HY$ of K users transmitted by an Access Point (AP), where $S_{MRC}=H^HY$ denotes a K*L matrix, with each row representing L data symbols of one user, and both K and L are positive integers;

a first acquiring module, configured to multiply $S_{MRC}$ by a conjugate transpose matrix $S_{MRC}{}^H$ of $S_{MRC}$ to obtain a K*K matrix $S_{MRC}S_{MRC}{}^H$;

a decomposition module, configured to perform singular value decomposition on the matrix $S_{MRC}S_{MRC}{}^H$ to obtain a unitary matrix $V=[v_1, v_2, \ldots v_K]$ and K real numbers $a_1\ a_2\ \ldots\ a_K$, such that $$\frac{1}{L}S_{MRC}S_{MRC}^H = VAV^H,$$

where $V^H$ is a transpose matrix of the unitary matrix V, and $$A = \begin{bmatrix} a_1 & & & \\ & a_2 & & \\ & & \ddots & \\ & & & a_K \end{bmatrix};$$

or calculate K characteristic values $a_1\ a_2\ \ldots\ a_K$ and corresponding K characteristic vectors $v_1, v_2, \ldots v_K$ of the matrix $S_{MRC}S_{MRC}{}^H$ or $$\frac{1}{L}S_{MRC}S_{MRC}^H,$$

such that $$\left(\frac{1}{L}S_{MRC}S_{MRC}^H\right)v_k = v_k a_k;$$

a second acquiring module, configured to obtain a diagonal matrix $$\Lambda = \begin{bmatrix} \lambda_1 & & & \\ & \lambda_2 & & \\ & & \ddots & \\ & & & \lambda_K \end{bmatrix},$$

where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP; and an estimation module, configured to estimate, by a formula $\tilde{S}=V\Lambda V^H S_{MRC}$, sending-end data symbols of the K users corresponding to the data symbol stream $S_{MRC}$.

According to an exemplary embodiment, the receiving module is further configured to receive the noise variance $\sigma^2$ transmitted by the AP, or determine the noise variance $\sigma^2$ according to an attribute of the AP.

According to an embodiment of the present disclosure, a multi-user detection apparatus for cell-free MIMO is further provided, is located in a CPU of a cell-free MIMO system, and includes:

a receiving module, configured to receive a data symbol stream $S_{MRC}=H^HY$ of K users transmitted by an Access Point (AP), where $S_{MRC}=H^HY$ denotes a K*L matrix, with each row representing L data symbols of one user, and both K and L are positive integers;

a decomposition module, configured to perform singular value decomposition on the matrix $S_{MRC}$ to obtain a unitary matrix $V=[v_1, v_2, \ldots v_K]$ and K real numbers $\omega_1, \omega_2, \ldots \omega_K$, such that $S_{MRC}=V(\sqrt{L}\Omega)U^H$, where $U^H$ is a transpose matrix of a unitary matrix U, and $\Omega$ is a K*L matrix:

$$\Omega = \begin{bmatrix} \omega_1 & & & \\ & \omega_2 & & 0 \\ & & \ddots & \\ & & & \omega_K \end{bmatrix};$$

an acquiring module, configured to obtain a diagonal matrix $$\Lambda = \begin{bmatrix} \lambda_1 & & & \\ & \lambda_2 & & \\ & & \ddots & \\ & & & \lambda_K \end{bmatrix},$$

where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP, $a_k = |\omega_k|^2$; and an estimation module, configured to estimate, by a formula $\tilde{S} = V\Lambda V^H S_{MRC}$, sending-end data symbols of the K users corresponding to the data symbol stream $S_{MRC}$, where $V^H$ is a transpose matrix of the unitary matrix V.

According to an exemplary embodiment, the receiving module is further configured to receive the noise variance $\sigma^2$ transmitted by the AP, or determine the noise variance $\sigma^2$ according to an attribute of the AP.

According to another embodiment of the present disclosure, a cell-free MIMO system is further provided and includes the multi-user detection apparatus according to any of the above embodiments.

According to another embodiment of the present disclosure, a computer-readable storage medium is further provided and stores computer programs, where the computer programs, when being executed by a processor, causes the processor to implement the operations in any above method embodiment.

According to another embodiment of the present disclosure, an electronic device is further provided and includes a memory and a processor, the memory stores computer programs, and the processor is configured to run the computer programs to implement the operations in any above method embodiment.

In the above embodiments of the present disclosure, the CPU does not need to acquire channel information of every user, and can estimate the data symbols only according to the MRC merged data symbols transmitted by the AP, such that the CPU can realize an optimal MMSE-based multi-user detection without increasing a fronthaul bandwidth from the AP to the CPU, thereby realizing optimal uplink multi-user transmission of the cell-free MIMO system.

DETAILED DESCRIPTION

Embodiments of the present disclosure are described in detail in reference to drawings and in combination with embodiments as below.

It needs to be explained that terms such as "first" and "second" of the specification and the claims of the present disclosure and the above drawings are used to distinguish similar objects but are unnecessarily used to describe specific sequences or precedence orders.

Figure 1:
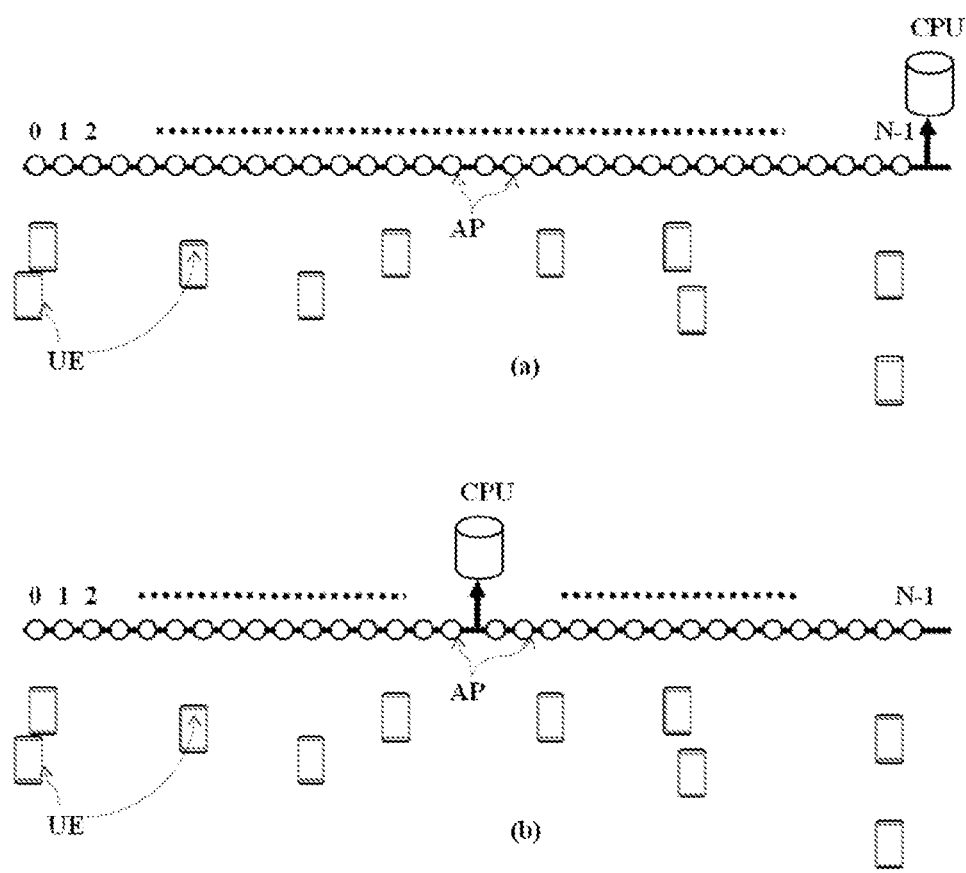
FIG. 1 is a schematic diagram of data symbol transmission of a cell-free MIMO system according to related technologies.

FIG. 1 is a schematic diagram of data symbol transmission of a cell-free MIMO system according to related technologies. As shown in FIG. 1, the cell-free MIMO system includes many access points (APs), each of which is denoted by one circle in the figure, and these access points are usually deployed in a distributed manner, and are connected to a Central Processing Unit (CPU) through a certain connection manner (topology). For example, N access points shown in FIG. 1(a) are connected to the CPU in a chained or strip-like connection manner. One part of N access points shown in FIG. 1(b) are connected to the CPU in a chained or strip-like connection manner, and the other part of the N access points are connected to the CPU in another chained or strip-like connection manner.

Wireless signals of the cell-free MIMO system are transmitted and received by the AP. Uplink multi-user transmission is illustrated in FIG. 1(a). Assuming that K pieces of UE transmit data to the AP (i.e., perform uplink data transmission), and L symbols transmitted by each user pass through the same wireless channel (channels through which the symbols of the different users pass are independent of each other), then L data symbols received by the $AP_m$ are denoted by:

$$y_m = \sum_{k=1}^{K} h_{mk} s_k + n_m,$$

where $y_m = [Y_{m,1}, y_{m,2}, \ldots y_{m,L}]$ denotes a vector constituted by the L data symbols received by the $AP_m$, and is a row vector having a length of L; $S_k = [S_{k,1}, S_{k,2}, S_{k,L}]$ denotes a row vector constituted by L data symbols transmitted by the $UE_k$; and $h_{mk}$ is a scalar denoting a wireless channel from the $UE_k$ to the $AP_m$, and $n_m$ denotes Additive White Gaussian Noise (AWGN) on the $AP_m$, and is a row vector having a length of L.

Further, signals received by the M APs may be written in the form of a matrix:

$$Y = \sum_{k=1}^{K} h_k s_k + N = HS + N,$$

where $$Y = \begin{bmatrix} y_1 \\ y_2 \\ \vdots \\ y_M \end{bmatrix}$$

denotes an M*L matrix having M rows, and the $m^{th}$ row is denoted by $y_m$;

$$S = \begin{bmatrix} s_1 \\ s_2 \\ \vdots \\ s_K \end{bmatrix}$$

denotes an L*L matrix, and the $m^{th}$ row is denoted by $S_m$; and $h_k = [h_{1,k}, h_{2,k}, \ldots h_{M,k}]^T$ denotes a spatial domain channel vector from a user k to the M APs, which is a column vector having a length of M, i.e., the column vector has M rows. $H = [h_1, h_2, \ldots h_K]$ denotes an M*K matrix. The AWGN noise N is an M*L matrix.

The MRC-based multi-user detection process of the cell-free MIMO system is as follows.

The $AP_m$ estimates the wireless channel $h_{mk}$ from the $UE_k$ to the $AP_m$ according to a reference signal from the $UE_k$, weights the received data symbol $y_m$ by using the conjugate $h_{mk}^H$ of $h_{mk}$ to obtain a data symbol $h_{mk}^H y_m$, related to the user k, adds the data symbol $h_{mk}^H y_m$, and a data symbol $$\sum_{j=1}^{m-1} h_{jk}^H y_j$$

related to the user k and transmitted by the previous AP (i.e., $AP_{m-1}$) to obtain $$\sum_{j=1}^{m} h_{jk}^H y_j = h_{mk}^H y_m + \sum_{j=1}^{m-1} h_{jk}^H y_j,$$

and then transmits the accumulated signal to a next AP (i.e., $AP_{m+1}$). In a similar way, a data symbol transmitted by the final AP, i.e., the $M^{th}$ AP to the CPU and related to the user k is $$\sum_{j=1}^{M} h_{jk}^* y_j.$$

The signal $$\sum_{j=1}^{M} h_{jk}^H y_j$$

related to the user k in the CPU may also be denoted by $h_k^H Y$, where $h_k^H$ is the conjugate transpose of the vector $h_k$. Further, $$h_k^H Y = h_k^H \sum_{j=1}^{K} h_j s_j + h_k^H N = \|h_k\|^2 s_k + \sum_{j=1, j \neq k}^{K} h_k^H h_j s_j + h_k^H N.$$

It is apparent that $h_k^H Y$ obtained in the CPU is the maximal ratio combining on the symbols of the user k. If the symbol $s_k$ of the user k in $h_k^H Y$ is normalized, normalized MRC of the symbol of the user k may be obtained, and denoted by $$s_{k,MRC} = \frac{1}{\|h_k\|^2} h_k^H Y = s_k + \frac{1}{\|h_k\|^2} \sum_{j=1, j \neq k}^{K} h_k^H h_j s_j + \frac{1}{\|h_k\|^2} h_k^H N.$$

In the above-mentioned MRC receiving method, each AP only needs to transmit the K data symbol streams to the next AP without transmitting other information. For example, the $AP_m$ only needs to transmit K data symbol streams $$\sum_{j=1}^{m} h_{jk}^H y_j$$

with a length of K to the $AP_{m+1}$, where k=1 ... K. However, according to the above formula $$s_{k,MRC} = s_k + \frac{1}{\|h_k\|^2} \sum_{j=1, j \neq k}^{K} h_k^H h_j s_j + \frac{1}{\|h_k\|^2} h_k^H N,$$

the MRC does not consider interference between the users, such that there will be a significant user interference item $$\frac{1}{\|h_k\|^2} \sum_{j=1, j \neq k}^{K} h_k^H h_j s_j$$

on the data symbol of the user k, and as a result, the performance is suboptimal.

A related MRC data symbol, received by the CPU, of the user k is $h_k^H Y$, and MRC data symbols of the K users are combined to be written as $S_{MRC} = H^H Y$.

The cell-free MIMO multi-user detection in the related art also adopts the ZF-based or MMSE-based multi-user detection with superior performance, but the APs are required to transmit to the CPU the channel information of users having access to the APs, so that the CPU can perform, according to relevance of user spatial domain channels, the multi-user detection restraining multi-user mutual interference, thereby achieving performance better than that of the MRC-based multi-user detection. Some examples of such multi-user detection with performance better than the MRC-based multi-user detection include a Zero Forcing (ZF)-based multi-user detection or a Minimum Mean Square Error (MMSE)-based multi-user detection.

Specifically, the CPU receives the MRC merged data symbols of the K users transmitted by the AP:

$$S_{MRC}=H^HY=H^H(HS+N)=H^HHS+H^HN.$$

$S_{MRC}=H^HY$ denotes a K*L matrix, with each row representing an MRC merged symbol stream of one user. If the AP transmits H to the CPU at the same time, after obtaining the H matrix, the CPU may adopt an MMSE criterion to estimate S, namely $S_{MMSE}=(H^H+\sigma^2I)^{-1}H^HY=(H^H+\sigma^2I)^{-1}S_{MRC}$, and in other words, MMSE estimation is adopted for estimating S according to Y after the CPU obtains H. Herein, $\sigma^2$ denotes a variance of AWGN on received signals of respective APs. In scenarios for the MMSE estimation, it is assumed that the CPU knows $\sigma^2$.

It is apparent that compared with the MRC-based multi-user detection, the ZF-based or MMSE-based multi-user detection method in the related art has one defect: the APs are required to transmit to the CPU the channel information of the users having access to the APs, but in the original MRC-based multi-user detection, the channel information of the users is not needed, which undoubtedly increases the fronthaul bandwidth from the APs to the CPU, resulting in an increase in cost of the cell-free MIMO system. The embodiments of the present disclosure provide a brand new method through which the AP does not need to transmit to the CPU the channel information of the users having access to the AP, that is, there is no need to increase the fronthaul bandwidth from the AP to the CPU, and in other words, the CPU can realize the optimal MMSE-based multi-user detection by adopting original MRC fronthaul.

Accordingly, an embodiment of the present disclosure provides a brand new MMSE-based multi-user detection method. In the embodiment, the CPU can realize the optimal MMSE-based multi-user detection without increasing the fronthaul bandwidth from the AP to the CPU, thereby realizing optimal uplink multi-user transmission of the cell-free MIMO system.

In the embodiment of the present disclosure, under the situation that the original MRC fronthaul is adopted and the AP does not need to transmit the channel information of the users, the CPU cannot directly obtain the channel information of the users, for example, the CPU does not know H. Without the channel information, the CPU cannot estimate, according to a conventional MMSE method, the data symbol S of each user. In the embodiment of the present disclosure, the CPU only utilizes an MRC merged data symbol $S_{MRC}=H^HY=H^H(HS+N)=H^HHS+H^HN$ transmitted by the AP to obtain a matrix $H^HH+\sigma^2I$, and then obtains MMSE estimation on S, i.e., $S_{MMSE}=(H^HH+\sigma^2I)^{-1}H^HY=(H^HH+\sigma^2I)^{-1}S_{MRC}$ according to $H^HH+\sigma^2I$ and $S_{MRC}$.

In the embodiment of the present disclosure, it is assumed that the CPU knows the noise variance $\sigma^2$ on the AP. For example, the CPU may be enabled to obtain the noise variance $\sigma^2$ by two following manners. The first manner is to make the AP transmit $\Gamma^2$ or information related to $\sigma^2$ to the CPU. The second manner is to make the CPU determine $\sigma^2$ according to an attribute of the AP without requiring the AP to transmit $\sigma^2$ or information related to $\sigma^2$.

Figure 2:
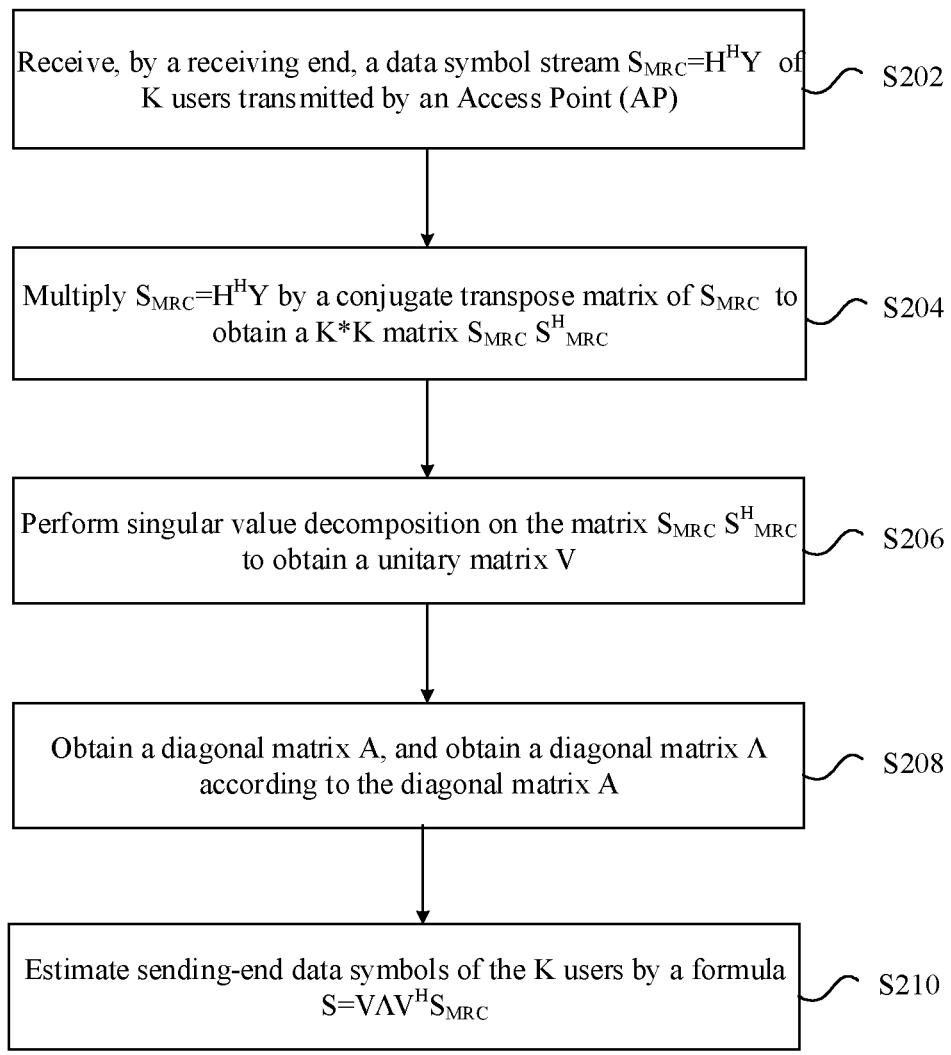
FIG. 2 is a flowchart of a multi-user detection method for cell-free MIMO according to an embodiment of the present disclosure.

The embodiment provides a multi-user detection method for cell-free MIMO. FIG. 2 is a flowchart according to an embodiment of the present disclosure. As shown in FIG. 2, the process includes following operations S202 to S210.

At S202, a CPU of a cell-free MIMO system receives a data symbol stream $S_{MRC}=H^HY$ of K users transmitted by an AP, where $S_{MRC}=H^HY$ denotes a K*L matrix, with each row representing L data symbols of one user, and both K and L are positive integers.

At S204, $S_{MRC}$ is multiplied by a conjugate transpose matrix $S_{MRC}^H$ of $S_{MRC}$ to obtain a K*K matrix $S_{MRC}S_{MRC}^H$.

At S206, singular value decomposition is performed on the matrix $S_{MRC}S_{MRC}^H$ to obtain a unitary matrix $V=[v_1, v_2, \ldots v_K]$ and K real numbers $a_1, a_2 \ldots a_K$, such that $$\frac{1}{L}S_{MRC}S_{MRC}^H = VAV^H,$$

where $V^H$ is a transpose matrix of the unitary matrix V, and $$A = \begin{bmatrix} a_1 & & & \\ & a_2 & & \\ & & \ddots & \\ & & & a_K \end{bmatrix}.$$

As an alternative of this operation, K characteristic values $a_1, a_2 \ldots a_K$ and corresponding K characteristic vectors $v_1, v_2, \ldots v_K$ of the matrix $S_{MRC}S_{MRC}^H$ or $$\frac{1}{L}S_{MRC}S_{MRC}^H$$

may be calculated, such that $$\left(\frac{1}{L}S_{MRC}S_{MRC}^H\right)v_k = v_k a_k,$$

and the K*K unitary matrix $V=[v_1, v_2, \ldots v_K]$ is constituted by the K characteristic vectors $v_k$.

At S208, a diagonal matrix $$\Lambda = \begin{bmatrix} \lambda_1 & & & \\ & \lambda_2 & & \\ & & \ddots & \\ & & & \lambda_K \end{bmatrix}$$

is obtained, where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP.

At S210, sending-end data symbols of the K users corresponding to the data symbol stream $S_{MRC}$ are estimated by a formula $\tilde{S}=V\Lambda V^H S_{MRC}$.

Figure 3:
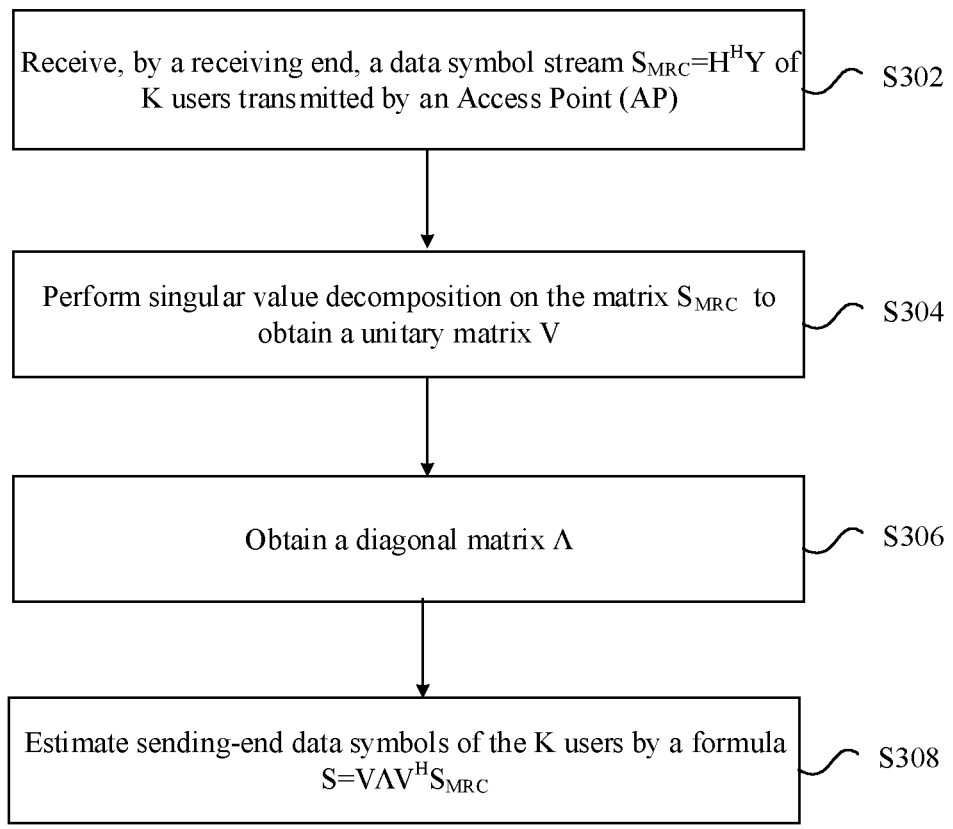
FIG. 3 is a flowchart of a multi-user detection method for cell-free MIMO according to another embodiment of the present disclosure.

The embodiment further provides a multi-user detection method for cell-free MIMO. FIG. 3 is a flowchart according to an embodiment of the present disclosure. As shown in FIG. 3, the process includes following operations S302 to S308.

At S302, a receiving end of a cell-free MIMO system receives a data symbol stream $S_{MRC}=H^HY$ of K users transmitted by an Access Point (AP), where $S_{MRC}=H^HY$ denotes a K*L matrix, with each row representing L data symbols of one user, and both K and L are positive integers.

At S304, singular value decomposition is performed on the matrix $S_{MRC}$ to obtain a unitary matrix $V=[v_1, v_2, \ldots v_K]$ and K real numbers $\omega_1, \omega_2, \ldots \omega_K$, such that $S_{MRC}=V(\sqrt{L\Omega})U^H$, where $U^H$ is a transpose matrix of a unitary matrix U, and $\Omega$ is a K*L matrix:

$$\Omega = \begin{bmatrix} \omega_1 & & & \\ & \omega_2 & & 0 \\ & & \ddots & \\ & & & \omega_K \end{bmatrix}.$$

At S306, a diagonal matrix $$\Lambda = \begin{bmatrix} \lambda_1 & & & \\ & \lambda_2 & & \\ & & \ddots & \\ & & & \lambda_K \end{bmatrix}$$

is obtained, where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP, $a_k=|\omega_k|^2$.

At S308, sending-end data symbols of the K users corresponding to the data symbol stream $S_{MRC}$ are estimated by a formula $\tilde{S}=V\Lambda V^H S_{MRC}$, and $V^H$ is a transpose matrix of the unitary matrix V.

Based on the description of the above implementations, those having ordinary skill in the art can clearly know that the method according to the above embodiments may be implemented by means of software and necessary universal hardware platforms and also may be implemented through hardware, but the former is the better implementation under many situations. Based on the understanding, the technical solutions of the present disclosure essentially or parts making contribution to the related art may be embodied in the form of a software product, and the computer software product is stored in a storage medium (e.g., a Read Only Memory (ROM)/Random Access Memory (RAM), a magnetic disk and a light disk) and includes a plurality of instructions used to enable a terminal device (e.g., a mobile phone, a computer, a server or a network device) to execute the method according to the embodiments of the present disclosure.

The embodiment further provides a multi-user detection apparatus for cell-free MIMO, and the apparatus is used for implementing the above embodiments and exemplary implementations which have been described and are not repeated. The term "module" used as below may realize combination of software and/or hardware with preset functions. Apparatuses described by the following embodiments are preferably realized by the software, but it is possible and conceivable for realizing the apparatuses through the hardware or combination of the software and the hardware.

Figure 4:
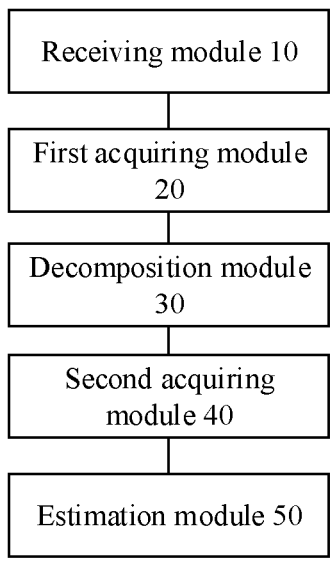
FIG. 4 is a module structure diagram of a multi-user detection apparatus for cell-free MIMO according to an embodiment of the present disclosure.

FIG. 4 is a structural block diagram of a multi-user detection apparatus for cell-free MIMO according to an embodiment of the present disclosure. The apparatus may be located in a CPU of a cell-free MIMO system, and as shown in FIG. 4, the apparatus includes:

a receiving module 10, configured to receive a data symbol stream $S_{MRC}=H^H Y$ of K users transmitted by an AP, where $S_{MRC}=H^H Y$ denotes a K*L matrix, with each row representing L data symbols of one user, and both K and L are positive integers;

a first acquiring module 20, configured to multiply $S_{MRC}$ by a conjugate transpose matrix $S_{MRC}^H$ of $S_{MRC}$ to obtain a K*K matrix $S_{MRC}S_{MRC}^H$;

a decomposition module 30, configured to perform singular value decomposition on the matrix $S_{MRC}S_{MRC}^H$ to obtain a unitary matrix $V=[v_1, v_2, \ldots v_K]$ and K real numbers $a_1 a_2 \ldots a_K$, such that $$\frac{1}{L} S_{MRC} S_{MRC}^H = VAV^H,$$

where $V^H$ is a transpose matrix of the unitary matrix V, and $$A = \begin{bmatrix} a_1 & & & \\ & a_2 & & \\ & & \ddots & \\ & & & a_K \end{bmatrix};$$

a second acquiring module 40, configured to obtain a diagonal matrix $$\Lambda = \begin{bmatrix} \lambda_1 & & & \\ & \lambda_2 & & \\ & & \ddots & \\ & & & \lambda_K \end{bmatrix},$$

where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP; and an estimation module 50, configured to estimate, by a formula $\tilde{S}=V\Lambda V^H S_{MRC}$, sending-end data symbols of the K users corresponding to the data symbol stream $S_{MRC}$.

In the embodiment, the decomposition module 30 may alternatively be configured to calculate K characteristic values $a_1 a_2 \ldots a_K$ and corresponding K characteristic vectors $v_1, v_2, \ldots, v_K$ of the matrix $S_{MRC}S_{MRC}^H$ or $$\frac{1}{L} S_{MRC} S_{MRC}^H,$$

such that $$\left(\frac{1}{L} S_{MRC} S_{MRC}^H\right) v_k = v_k a_k,$$

and constitute the K*K unitary matrix $V=[v_1, v_2, \ldots v_K]$ by the K characteristic vectors $v_k$.

Figure 5:
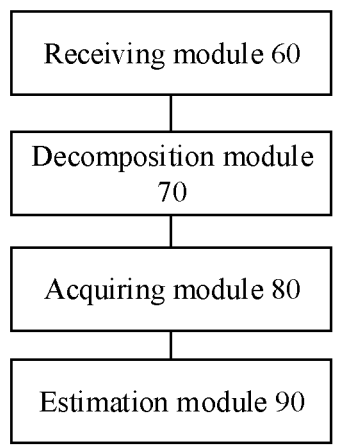
FIG. 5 is a module structure diagram of a multi-user detection apparatus for cell-free MIMO according to another embodiment of the present disclosure.

FIG. 5 is a structural block diagram of a multi-user detection apparatus for cell-free MIMO according to another embodiment of the present disclosure. The apparatus is located in a CPU of a cell-free MIMO system, and as shown in FIG. 5, the apparatus includes:

a receiving module 60, configured to receive a data symbol stream $S_{MRC}=H^HY$ of K users transmitted by an AP, where $S_{MRC}=H^HY$ denotes a K*L matrix, with each row representing L data symbols of one user, and both K and L are positive integers;

a decomposition module 70, configured to perform singular value decomposition on the matrix $S_{MRC}$ to obtain a unitary matrix $V=[v_1, v_2, \ldots v_K]$ and K real numbers $\omega_1, \omega_2, \ldots \omega_K$, such that $S_{MRC}=V(\sqrt{L}\Omega)U^H$, where $U^H$ is a transpose matrix of a unitary matrix U, and $\Omega$ is a K*L matrix:

$$\Omega = \begin{bmatrix} \omega_1 & & & 0 \\ & \omega_2 & & \\ & & \ddots & \\ & & & \omega_K \end{bmatrix};$$

an acquiring module 80, configured to obtain a diagonal matrix $$\Lambda = \begin{bmatrix} \lambda_1 & & & \\ & \lambda_2 & & \\ & & \ddots & \\ & & & \lambda_K \end{bmatrix},$$

where $$\lambda_k = \frac{2}{\sqrt{\sigma^4+4a_k}+\sigma^2} \text{ or } \lambda_k = \frac{2}{\sqrt{\sigma^4+4a_k}+c\sigma^2},$$

c is a real number greater than 1, and $\sigma^2$ is a noise variance on received signals of the AP, $a_k=|\omega_k|^2$; and an estimation module 90, configured to estimate, by a formula $\tilde{S}=V\Lambda V^H S_{MRC}$, sending-end data symbols of the K users corresponding to the data symbol stream $S_{MRC}$, where $V^H$ is a transpose matrix of the unitary matrix V.

It needs to be explained that the above modules may be realized through the software or hardware, and for the latter, the modules may be realized by modes including but not limited to a following mode that the above modules are all located in the same processor; or the above modules are respectively located in different processors in the form of any combination.

Figure 6:
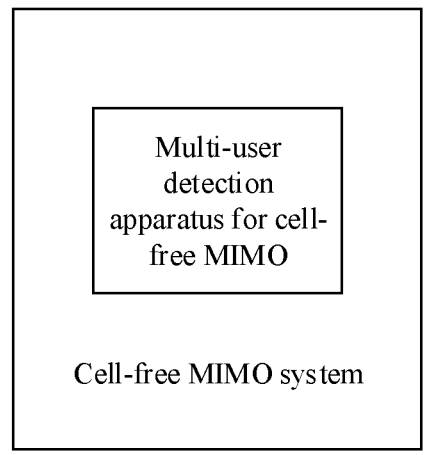
FIG. 6 is a schematic structural diagram of a cell-free MIMO system according to an embodiment of the present disclosure.

FIG. 6 illustrates a cell-free MIMO system according to an embodiment of the present disclosure. As shown in FIG. 6, the system includes the multi-user detection apparatus according to the above embodiment.

To facilitate understanding of the technology provided by the present disclosure, the embodiments are described in detail in combination with specific scenarios.

Embodiment 1

Figure 7:
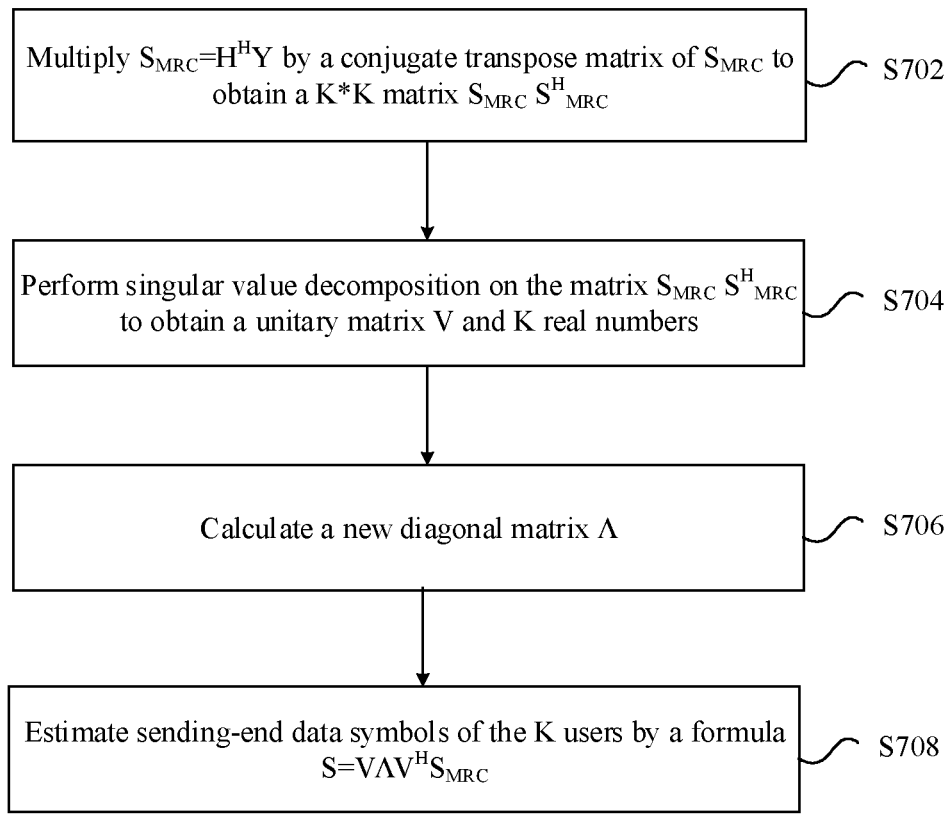
FIG. 7 is a flowchart of a multi-user detection method for cell-free MIMO according to an embodiment 1 of the present disclosure.

The embodiment provides a multi-user detection apparatus for cell-free MIMO. In the embodiment, during cell-free MIMO uplink transmission, after receiving a user data symbol stream $S_{MRC}=H^HY$ transmitted by an AP (the matrix $S_{MRC}$ has K rows, each row has L symbols representing MRC of L data symbols of one user), a CPU obtains a matrix $H^HH+\sigma^2I$ based on $S_{MRC}$, and then obtains MMSE estimation of a data symbol S of each user according to $H^HH+\sigma^2I$ and $S_{MRC}$. As shown in FIG. 7, the method in the embodiment includes following operations S702 to S708.

At S702, a data symbol matrix $S_{MRC}$ is multiplied by a conjugate transpose matrix $S_{MRC}^H$ of $S_{MRC}$ to obtain a K*K matrix $S_{MRC}S_{MRC}^H$.

At S704, SVD is performed on a square matrix $S_{MRC}S_{MRC}^H$ or $$\frac{1}{L}S_{MRC}S_{MRC}^H$$

or on a matrix $cS_{MRC}S_{MRC}^H$ formed by multiplying the matrix $S_{MRC}S_{MRC}^H$ by any constant, so as to obtain a K*K unitary matrix V and K real numbers $a_1\ a_2 \ldots a_K$, such that $S_{MRC}S_{MRC}^H=V(L\cdot A)V^H$, namely $$\frac{1}{L}S_{MRC}S_{MRC}^H = VAV^H,$$

where c is a constant, A is a K*K diagonal matrix with the K real numbers $a_1\ a_2 \ldots a_K$ as diagonal elements, namely $$A = \begin{bmatrix} a_1 & & & \\ & a_2 & & \\ & & \ddots & \\ & & & a_K \end{bmatrix},$$

and off-diagonal elements of the diagonal matrix are all 0.

In the embodiment, alternatively, K characteristic values $a_1\ a_2 \ldots a_K$ and corresponding K characteristic vectors $v_1, v_2, \ldots, v_K$ of the square matrix $S_{MRC}S_{MRC}^H$ or $$\frac{1}{L}S_{MRC}S_{MRC}^H$$

may be calculated, such that $$\left(\frac{1}{L}S_{MRC}S_{MRC}^H\right)v_k = v_k a_k$$

which is satisfied for $k=1, 2 \ldots K$. The K characteristic vectors $v_k$ constitute a K*K unitary matrix $V=[v_1, v_2, \ldots v_K]$.

At S706, a new diagonal matrix $$\Lambda = \begin{bmatrix} \lambda_1 & & & \\ & \lambda_2 & & \\ & & \ddots & \\ & & & \lambda_K \end{bmatrix}$$

is calculated, where $$\lambda_k = \frac{2}{\sqrt{\sigma^4+4a_k}+\sigma^2}, \text{ or } \lambda_k = \frac{2}{\sqrt{\sigma^4+4a_k}+c\sigma^2},$$

and c is a real number greater than 1.

At S708, $\tilde{S}=V\Lambda V^H S_{MRC}$ is calculated, such that corresponding sending-end data symbols of the K users are estimated.

Embodiment 2

Figure 8:
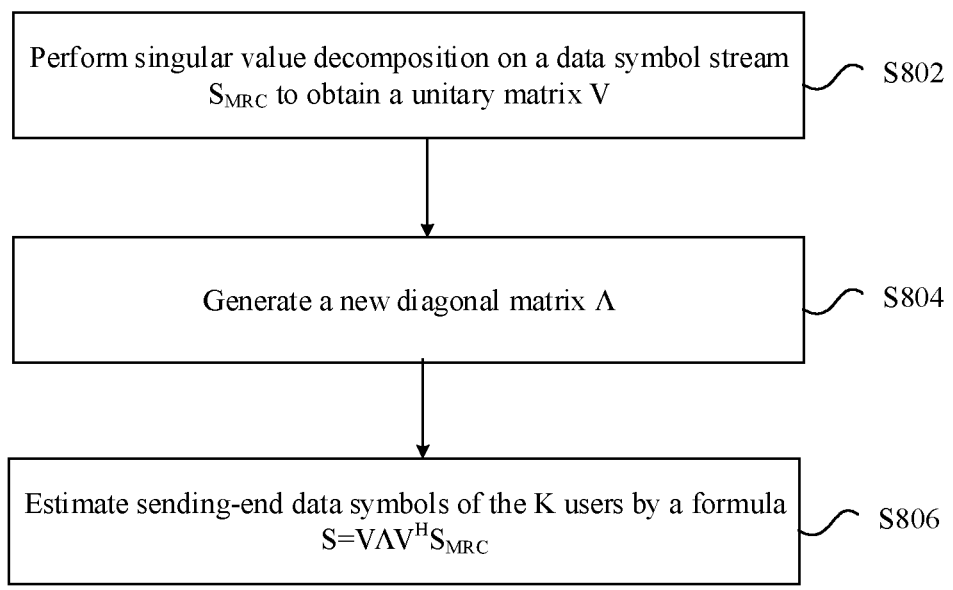
FIG. 8 is a flowchart of a multi-user detection method for cell-free MIMO according to an embodiment 2 of the present disclosure.

The embodiment provides a multi-user detection apparatus for cell-free MIMO. In the embodiment, during cell-free MIMO uplink transmission, after receiving a user data symbol stream $S_{MRC}=H^H Y$ transmitted by an AP (the matrix $S_{MRC}$ has K rows, each row has L symbols representing MRC of L data symbols of one user), a CPU obtains a matrix $H^H H+\sigma^2 I$ based on $S_{MRC}$, and then obtains MMSE estimation of a data symbol S of each user according to $H^H H+\sigma^2 I$ and $S_{MRC}$. As shown in FIG. 8, the flow in the embodiment includes following operations S802 to S806.

At S802, SVD is performed on a K*L data symbol matrix $S_{MRC}$ or $$\frac{1}{\sqrt{L}} S_{MRC}$$

to obtain a K*K unitary matrix V and K real numbers $\omega_1, \omega_2, \ldots \omega_K$, such that $S_{MRC}=V(\sqrt{L}\Omega)U^H$ or $$\frac{1}{\sqrt{L}} S_{MRC} = V\Omega U^H,$$

where $\Omega$ is a K*L matrix generated by the K real numbers $\omega_1, \omega_2, \ldots \omega_K$, $U^H$ is a K*K transpose matrix which may be uniquely determined through the SVD:

$$\Omega = \begin{bmatrix} \omega_1 & & & 0 \\ & \omega_2 & & \\ & & \ddots & \\ & & & \omega_K \end{bmatrix}.$$

At S804, a new diagonal matrix $$\Lambda = \begin{bmatrix} \lambda_1 & & & \\ & \lambda_2 & & \\ & & \ddots & \\ & & & \lambda_K \end{bmatrix}$$

is generated, where $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

and c is a real number greater than 1, $a_k=|\omega_k|^2$.

At S806, $\tilde{S}=V\Lambda V^H S_{MRC}$ is calculated, such that corresponding sending-end data symbols of K users are estimated.

To facilitate understanding of the above embodiments of the present disclosure, principles on which the embodiments of the present disclosure are based will be described in detail below.

When K users have access to M APs at the same time, each user sends L data symbols, and a symbol matrix received by the CPU is:

$$S_{MRC}=H^H Y=H^H(HS+N)=H^H HS+H^H N,$$

where $$Y = \begin{bmatrix} y_0 \\ y_1 \\ \vdots \\ y_{M-1} \end{bmatrix}$$

denotes an M*L matrix having M rows, and the $m^{th}$ row is $y_m$, which denotes the L data symbols received by the $m^{th}$ AP.

$$S = \begin{bmatrix} s_0 \\ s_1 \\ \vdots \\ s_{K-1} \end{bmatrix}$$

denotes a K*L matrix, the $k^{th}$ row is $S_k$, which denotes L data symbols sent by $k^{th}$ UE.

$H=[h_0, h_1, \ldots h_{K-1}]$ denotes an M*K matrix, where the $k^{th}$ column.

$h_k=[h_{0,k}, h_{1,k}, \ldots, h_{M-1,k}]^T$ denotes a spatial domain channel vector from the user k to the M APs, which is a column vector having a length of M, i.e., the column vector has M rows. The AWGN noise N is an M*L matrix.

Thus, the symbol matrix $S_{MRC}$ received by the CPU is a K*L matrix.

If H or $H^H H$ is given, MMSE estimation may be performed on the data symbol S of each user according to $S_{MRC}=H^H Y$, that is, $S_{MMSE}=(H^H+\sigma^2 I)^{-1} H^H Y = (H^H H+\sigma^2 I)^{-1} S_{MRC}$.

I denotes a K*K unit matrix. Assuming that modulation symbols transmitted by the users all have normalized energy, the variance of the AWGN on each AP is $\sigma^2$.

But the CPU does not know H and $H^H H$, and thus the above MMSE cannot be implemented. However, it can be seen that after obtaining the data symbol $S_{MRC}=H^H Y$, the CPU can further obtain $H^H H+\sigma^2 I$ required by the MMSE as long as obtaining $H^H H$ from the data symbol $S_{MRC}$, thereby implementing the MMSE.

How to obtain $H^H H+\sigma^2 I$ from the data symbol $S_{MRC}$ is described below.

1) Due to $S_{MRC}=H^H Y=H^H HS+H^H N$, a correlation matrix of $S_{MRC}$ is:

$$C_{MRC}=S_{MRC} S_{MRC}^H=(H^H HS+H^H N)(H^H HS+H^H N)^H$$

Because the AWGN on the different APs is independent while the data symbols of the different users are independent as well, along with increasing of the symbol number L, $$\frac{SS^H}{L}$$

will approach the K*K unit matrix while $$\frac{NN^H}{L}$$

will approach a product of the K*K unit matrix and $\sigma^2$. Thus, as long as the symbol number L is large enough, $(H^H HH^H H+\sigma^2 H^H)$ may be replaced with $$\frac{1}{L}S_{MRC}S_{MRC}^*.$$

2) Further, because $H^H H$ is a complex symmetric matrix, suppose $H^H H = VXV^H$, $$X = \begin{bmatrix} x_1 & & & \\ & x_2 & & \\ & & \ddots & \\ & & & x_K \end{bmatrix}$$

is a diagonal matrix, off-diagonal elements are 0, and elements $x_k$ on the diagonal line are non-negative real numbers not less than 0, that is, $x_k \geq 0$. V is a unitary matrix, and $V^H$ is a conjugate symmetric matrix of V.

How to obtain V and X from $(H^H H H^H H + \sigma^2 H^H H)$ is described below.

$H^H H = VXV^H$ is substituted into $(H^H H H^H H + \sigma^2 H^H H)$ to obtain:

$$(H^H H H^H H + \sigma^2 H^H H) = V \begin{bmatrix} x_1^2 + \sigma^2 x_1 & 0 & \ldots & 0 \\ 0 & x_2^2 + \sigma^2 x_2 & \ldots & 0 \\ \ldots & \ldots & \ldots & \ldots \\ 0 & 0 & \ldots & x_K^2 + \sigma^2 x_K \end{bmatrix} V^H$$

Further, SVD is performed on $$\frac{1}{L}S_{MRC}S_{MRC}^*,$$

namely, $(H^H H H^H H + \sigma^2 H^H H)$ to obtain:

$H^H H H^H H + \sigma^2 H^H H = V \Lambda V^H$, where $$A = \begin{bmatrix} a_1 & & & \\ & a_2 & & \\ & & \ddots & \\ & & & a_K \end{bmatrix}.$$

Because singular values of one matrix are unique, suppose that the singular values are arranged in order, then $x_k^2 + \sigma^2 x_k = a_k$ may be obtained, where $k = 1, \ldots, K$. Each of the K relational expressions is essentially a quadratic equation in one unknown, and may have two solutions. However, due to $x_k \geq 0$, the negative solution is meaningless, and accordingly, $$x_k = \frac{\sqrt{\sigma^4 + 4a_k} - \sigma^2}{2}$$

can be obtained, where $k = 1, \ldots, K$.

Thus, V and X in $H^H H = VXV^H$ both can be obtained by the SVD on $$\frac{1}{L}S_{MRC}S_{MRC}^*.$$

Further, $H^H H + \sigma^2 I = V(X + \sigma^2 I)V^H$ can be obtained, suppose $\Lambda = (X + \sigma^2 I)^{-1}$, namely, $$\lambda_k = \frac{1}{x_k + \sigma^2} = \frac{1}{\frac{\sqrt{\sigma^4 + 4a_k} - \sigma^2}{2} + \sigma^2} = \frac{2}{\sqrt{\sigma^4 + 4a_k} + \sigma^2},$$

thus, MMSE estimation may be performed on the data symbol S of each user according to $S_{MRC} = H^H Y$ that is, $S_{MMSE} = (H^H H + \sigma^2 I)^{-1} H^H Y = (H^H H + \sigma^2 I)^{-1} S_{MRC} = V(X + \sigma^2 I)^{-1} V^H S_{MRC} = V \Lambda V^H S_{MRC}$.

Another method for obtaining $H^H H + \sigma^2 I$ from the data symbol $S_{MRC}$ is described below.

1) Due to $S_{MRC} = H^H Y = H^H HS + H^H N$, a correlation matrix of $S_{MRC}$ is:

$$C_{MRC} = S_{MRC} S_{MRC}^H = (H^H HS + H^H N)(H^H HS + H^H N)^H.$$

Because the AWGN on the different APs is independent while the data symbols of the different users are independent as well, along with increasing of the symbol number L, $$\frac{SS^H}{L}$$

will approach the K*K unit matrix while $$\frac{NN^H}{L}$$

will approach a product of the K*K unit matrix and $\sigma^2$. Thus, as long as the symbol number L is large enough, $(H^H H H^H H + \sigma^2 H^H H)$ may be replaced with $$\frac{1}{L}S_{MRC}S_{MRC}^*.$$

2) Further, according to $$H^H H H^H H + \sigma^2 H^H H = \frac{1}{L}S_{MRC}S_{MRC}^*,$$

$$H^H H H^H H + \sigma^2 H^H H + \frac{1}{4}\sigma^2 I_{K \times K} = \frac{1}{L}S_{MRC}S_{MRC}^* + \frac{1}{4}\sigma^2 I_{K \times K},$$

that is, $$\left(H^H H + \frac{1}{2}\sigma^2 I_{K \times K}\right)\left(H^H H + \frac{1}{2}\sigma^2 I_{K \times K}\right) = \frac{1}{L}S_{MRC}S_{MRC}^* + \frac{1}{4}\sigma^2 I_{K \times K}$$

thus, $$H^H H + \frac{1}{2}\sigma^2 I_{K \times K} = \sqrt{\frac{1}{L}S_{MRC}S_{MRC}^* + \frac{1}{4}\sigma^2 I_{K \times K}},$$

$S_{MRC} = H^H Y = H^H(HS + N) = H^H HS + H^H N,$ accordingly, $$H^H H + \sigma^2 I_{K \times K} = \sqrt{\frac{1}{L} S_{MRC} S^*_{MRC} + \frac{1}{4}\sigma^2 I_{K \times K}} + \frac{1}{2}\sigma^2 I_{K \times K}$$

can be further obtained,
and thus, MMSE estimation may be performed on the data symbol S of each user according to $S_{MRC}=H^H Y$ that is, $$S_{MMSE} = (H^H H + \sigma^2 I)^{-1} H^H Y =$$

$$(H^H H + \sigma^2 I)^{-1} S_{MRC} = \left( \sqrt{\frac{1}{L} S_{MRC} S^*_{MRC} + \frac{1}{4}\sigma^2 I_{K \times K}} + \frac{1}{2}\sigma^2 I_{K \times K} \right)^{-1} S_{MRC}$$

An embodiment of the present disclosure further provides a computer-readable storage medium storing computer programs, where the computer programs, when being executed by a processor, causes the processor to implement the operations in any above method embodiment.

In an exemplary embodiment, the above computer-readable storage medium may include but not limited to: a U disk, a Read-Only Memory (ROM), a Random Access Memory (RAM), a mobile hard disk, a magnetic disk or a light disk or other media capable of storing the computer programs.

An embodiment of the present disclosure further provides an electronic device including a memory and a processor, where the memory stores computer programs, and the processor is configured to run the computer programs to implement the operations in above any method embodiment.

In an exemplary embodiment, the above electronic device may further include a transmission device and an input and output device, where the transmission device is connected to the above processor, and the input and output device is connected to the above processor.

Specific examples in the embodiment may refer to the examples described in the above embodiments and exemplary implementations, so that no detail is repeated in the embodiment.

Obviously, those having ordinary skill in the art should understand that the modules or operations in the present disclosure may be implemented through a universal computing device, may be centralized in a single computing device or distributed in a network formed by multiple computing devices, and may be implemented by executable program code of the computing device, such that the modules or operations may be stored in a storage apparatus to be executed by the computing device; and the shown or described operations may be executed in sequence different from the sequence herein under some situations, or the modules or operations may be made into various integrated circuit modules, or more of the modules or operations may be made into single integrated circuit modules to be implemented. Thus, the present disclosure is not limited to any specific hardware and software combination.

The above contents are merely exemplary embodiments of the present disclosure, and are not intended to limit the present disclosure, and for those having ordinary skill in the art, the present disclosure may have various modifications and changes. Any modification, equivalent replacement, improvement, etc. made within the principle of the present disclosure shall fall within the scope of protection of the present disclosure.

What is claimed is:

1. A multi-user detection method for cell-free Multiple-Input Multiple-Output (MIMO), comprising:

receiving, by a Central Processing Unit (CPU) of a cell-free MIMO system, a Maximal Ratio Combining (MRC) merged data symbol stream $S_{MRC}=H^H Y$ of K users transmitted by an Access Point (AP), wherein $S_{MRC}=H^H Y$ denotes a K*L matrix, with each row representing L data symbols of one user, and both K and L are positive integers;

multiplying $S_{MRC}$ by a conjugate transpose matrix $S_{MRC}{}^H$ of $S_{MRC}$ to obtain a K*K matrix $S_{MRC} S_{MRC}{}^H$;

performing singular value decomposition on the matrix $S_{MRC} S_{MRC}{}^H$ or $$\frac{1}{L} S_{MRC} S^H_{MRC}$$

or on a matrix $c S_{MRC} S_{MRC}{}^H$ formed by multiplying the matrix $S_{MRC} S_{MRC}{}^H$ by any constant c to obtain a unitary matrix $V=[v_1, v_2, \ldots v_K]$ and K real numbers $a_1 a_2 \ldots a_K$, such that $$\frac{1}{L} S_{MRC} S^H_{MRC} = VAV^H,$$

wherein $V^H$ is a transpose matrix of the unitary matrix V, and $$A = \begin{bmatrix} a_1 & & & \\ & a_2 & & \\ & & \ddots & \\ & & & a_K \end{bmatrix}$$

is a diagonal matrix constituted by the K real numbers $a_1 a_2 \ldots a_x$ as diagonal elements; or calculating K characteristic values $a_1 a_2 \ldots a_K$ and corresponding K characteristic vectors $v_1, v_2, \ldots V_K$ of the matrix $S_{MRC} S_{MRC}{}^H$ or $$\frac{1}{L} S_{MRC} S^H_{MRC},$$

such that $$\left( \frac{1}{L} S_{MRC} S^H_{MRC} \right) v_k = v_k a_k;$$

obtaining a diagonal matrix $$\Lambda = \begin{bmatrix} \lambda_1 & & & \\ & \lambda_2 & & \\ & & \ddots & \\ & & & \lambda_K \end{bmatrix},$$

wherein $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP; and estimating, by a formula $\tilde{S}=V\Lambda V^H S_{MRC}$, sending-end data symbols of the K users corresponding to the data symbol stream $S_{MRC}$.

2. The method according to claim 1, wherein before obtaining the diagonal matrix $\Lambda$, the method further comprises:

receiving, by the CPU, the noise variance $\sigma^2$ transmitted by the AP, or determining, by the CPU, the noise variance $\sigma^2$ according to an attribute of the AP.

3. A non-transitory computer-readable storage medium, storing computer programs, wherein the computer programs, when being executed by a processor, causes the processor to implement the operations of the method according to claim 1.

4. The method according to claim 1, wherein in a case of calculating K characteristic values $a_1\ a_2\ \ldots\ a_K$ and corresponding K characteristic vectors $v_1, v_2, \ldots v_K$ of the matrix $S_{MRC} S_{MRC}^H$ or $$\frac{1}{L} S_{MRC} S_{MRC}^H,$$

such that $$\left(\frac{1}{L} S_{MRC} S_{MRC}^H\right) v_k = v_k a_k,$$

the method further comprises:

constituting a K*K unitary matrix $V=[v_1, v_2, \ldots v_K]$ by the K characteristic vectors $v_k$.

5. The method according to claim 1, wherein off-diagonal elements of the diagonal matrix $$A = \begin{bmatrix} a_1 & & & \\ & a_2 & & \\ & & \ddots & \\ & & & a_K \end{bmatrix}$$

are all 0.

6. The method according to claim 1, wherein estimating, by a formula $\tilde{S}=V\Lambda V^H S_{MRC}$, sending-end data symbols of the K users corresponding to the data symbol stream $S_{MRC}$ comprises:

obtaining MMSE estimation of sending-end data symbols of the K users according to $H^H H + \sigma^2 I$ and $S_{MRC}$.

7. A multi-user detection method for cell-free Multiple-Input Multiple-Output (MIMO), comprising:

receiving, by a Central Processing Unit (CPU) of a cell-free MIMO system, a Maximal Ratio Combining (MRC) merged data symbol stream $S_{MRC}=H^H Y$ of K users transmitted by an Access Point (AP), wherein $S_{MRC}=H^H Y$ denotes a K*L matrix, with each row representing L data symbols of one user, and both K and L are positive integers;

performing singular value decomposition on the matrix $S_{MRC}$ or $1/\sqrt{L} S_{MRC}$ to obtain a unitary matrix $V=[v_1, v_2, \ldots v_K]$ and K real numbers $\omega_1, \omega_2, \ldots \omega_K$, such that $S_{MRC}=V(\sqrt{L}\Omega)U^H$ or $1/\sqrt{L} S_{MRC}=V\Omega U^H$, wherein $U^H$ is a transpose matrix of a unitary matrix U, and $\Omega$ is a K*L matrix:

$$\Omega = \begin{bmatrix} \omega_1 & & & 0 \\ & \omega_2 & & \\ & & \ddots & \\ & & & \omega_K \end{bmatrix};$$

obtaining a diagonal matrix $$\Lambda = \begin{bmatrix} \lambda_1 & & & \\ & \lambda_2 & & \\ & & \ddots & \\ & & & \lambda_K \end{bmatrix},$$

wherein $$\lambda_k = \frac{2}{\sqrt{\sigma^4 + 4a_k} + \sigma^2} \text{ or } \lambda_k = \frac{2}{\sqrt{\sigma^4 + 4a_k} + c\sigma^2},$$

c is a real number greater than 1, and $\sigma^2$ is a noise variance on received signals of the AP, $a_k=|\omega_k|^2$; and estimating, by a formula $\tilde{S}=V\Lambda V^H S_{MRC}$, Sending-end data symbols of the K users corresponding to the data symbol stream $S_{MRC}$, wherein $V^H$ is a transpose matrix of the unitary matrix V.

8. The method according to claim 7, wherein before obtaining the diagonal matrix $\Lambda$, the method further comprises:

receiving, by the CPU, the noise variance $\sigma^2$ transmitted by the AP, or determining, by the CPU, the noise variance $\sigma^2$ according to an attribute of the AP.

9. A multi-user detection apparatus for cell-free Multiple-Input Multiple-Output (MIMO), located in a Central Processing Unit (CPU) of a cell-free MIMO system, and comprising a memory storing instructions and a processor in communication with the memory, wherein the processor is configured to execute the instructions to implement the operations of the method according to claim 8.

10. A multi-user detection apparatus for cell-free Multiple-Input Multiple-Output (MIMO), located in a Central Processing Unit (CPU) of a cell-free MIMO system, and comprising a memory storing instructions and a processor in communication with the memory, wherein the processor is configured to execute the instructions to implement the operations of the method according to claim 7.

11. A cell-free Multiple-Input Multiple-Output (MIMO) system, comprising the multi-user detection apparatus according to claim 10.

12. The method according to claim 7, wherein estimating, by a formula $\tilde{S}=V\Lambda V^H S_{MRC}$, sending-end data symbols of the K users corresponding to the data symbol stream $S_{MRC}$ comprises:

obtaining MMSE estimation of sending-end data symbols of the K users according to $H^H H + \sigma^2 I$ and $S_{MRC}$.

13. A multi-user detection apparatus for cell-free Multiple-Input Multiple-Output (MIMO), located in a Central Processing Unit (CPU) of a cell-free MIMO system, and comprising a memory storing instructions and a processor in communication with the memory, wherein the processor is configured to execute the instructions to implement the operations of the method according to claim 12.

14. A non-transitory computer-readable storage medium, storing computer programs, wherein the computer programs, when being executed by a processor, causes the processor to implement the operations of the method according to claim 7.

15. A multi-user detection apparatus for cell-free Multiple-Input Multiple-Output (MIMO), located in a Central Processing Unit (CPU) of a cell-free MIMO system, and comprising a memory storing instructions and a processor in communication with the memory, wherein the processor is configured to execute the instructions to:
 receive a data symbol stream $S_{MRC}=H^HY$ of K users transmitted by an Access Point (AP), wherein $S_{MRC}=H^HY$ denotes a K*L matrix, with each row representing L data symbols of one user, and both K and L are positive integers;
 multiply $S_{MRC}$ by a conjugate transpose matrix $S_{MRC}{}^H$ of $S_{MRC}$ to obtain a K*K matrix $S_{MRC}S_{MRC}{}^H$;
 perform singular value decomposition on the matrix $S_{MRC}S_{MRC}{}^H$ or $$\frac{1}{L}S_{MRC}S_{MRC}^H$$

or on a matrix $cS_{MRC}S_{MRC}{}^H$ formed by multiplying the matrix $S_{MRC}S_{MRC}{}^H$ by any constant c to obtain a unitary matrix $V=[v_1, v_2, \ldots v_K]$ and K real numbers $a_1\ a_2\ \ldots\ a_K$, such that $$\frac{1}{L}S_{MRC}S_{MRC}^H = V A V^H,$$

wherein $V^H$ is a transpose matrix of the unitary matrix V, and $$A = \begin{bmatrix} a_1 & & & \\ & a_2 & & \\ & & \ddots & \\ & & & a_K \end{bmatrix}$$

is a diagonal matrix constituted by the K real numbers as diagonal elements; or calculate K characteristic values $a_1\ a_2\ \ldots\ a_K$ and corresponding K characteristic vectors $v_1, v_2, \ldots v_K$ of the matrix $S_{MRC}S_{MRC}{}^H$ or $$\frac{1}{L}S_{MRC}S_{MRC}^H,$$

such that $$\left(\frac{1}{L}S_{MRC}S_{MRC}^H\right)v_k = v_k a_k;$$

obtain a diagonal matrix $$\Lambda = \begin{bmatrix} \lambda_1 & & & \\ & \lambda_2 & & \\ & & \ddots & \\ & & & \lambda_K \end{bmatrix},$$

wherein $$\lambda_k = \frac{2}{\sqrt{\sigma^4+4a_k}+\sigma^2} \text{ or } \lambda_k = \frac{2}{\sqrt{\sigma^4+4a_k}+c\sigma^2},$$

c is a real number greater than 1, and $\sigma^2$ is a noise variance on received signals of the AP; and
 estimate, by a formula $\tilde{S}=V\Lambda V^H S_{MRC}$, sending-end data symbols of the K users corresponding to the data symbol stream $S_{MRC}$.

16. The apparatus according to claim 15, wherein the processor is further configured to execute the instructions to receive the noise variance $\sigma^2$ transmitted by the AP, or determine the noise variance $\sigma^2$ according to an attribute of the AP.

17. A cell-free Multiple-Input Multiple-Output (MIMO) system, comprising the multi-user detection apparatus according to claim 15.

18. The apparatus according to claim 15, wherein in a case of calculating K characteristic values $a_1\ a_2\ \ldots\ a_K$ and corresponding K characteristic vectors $v_1, v_2, \ldots v_K$ of the matrix $S_{MRC}S_{MRC}{}^H$ or $$\frac{1}{L}S_{MRC}S_{MRC}^H,$$

such that $$\left(\frac{1}{L}S_{MRC}S_{MRC}^H\right)v_k = v_k a_k,$$

the processor is further configured to execute the instructions to:
 constitute a K*K unitary matrix $V=[v_1, v_2, \ldots v_K]$ by the K characteristic vectors $v_k$.

19. The apparatus according to claim 15, wherein off-diagonal elements of the diagonal matrix $$A = \begin{bmatrix} a_1 & & & \\ & a_2 & & \\ & & \ddots & \\ & & & a_K \end{bmatrix}$$

are all 0.

20. The apparatus according to claim 15, wherein the processor is configured to execute the instructions to:
 obtain MMSE estimation of sending-end data symbols of the K users according to $H^H H+\sigma^2 I$ and $S_{MRC}$.

* * * * *